United States Patent
So

(10) Patent No.: US 8,694,673 B2
(45) Date of Patent: Apr. 8, 2014

(54) SYSTEMS AND METHODS FOR HOST IDENTIFICATION

(75) Inventor: Ning So, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1243 days.

(21) Appl. No.: 11/768,701

(22) Filed: Jun. 26, 2007

(65) Prior Publication Data

US 2009/0003828 A1 Jan. 1, 2009

(51) Int. Cl.
*G06F 15/173* (2006.01)

(52) U.S. Cl.
USPC .......................................................... 709/238

(58) Field of Classification Search
USPC ............... 709/238; 370/392, 469; 398/56–58
See application file for complete search history.

(56) References Cited

U.S. PATENT DOCUMENTS

| | | | |
|---|---|---|---|
| 7,068,654 B1* | 6/2006 | Joseph et al. | 370/392 |
| 7,072,978 B2* | 7/2006 | Tsuboi et al. | 709/238 |
| 2002/0071152 A1* | 6/2002 | Blumenthal | 359/123 |
| 2002/0163935 A1* | 11/2002 | Paatela et al. | 370/466 |
| 2004/0202171 A1* | 10/2004 | Hama | 370/395.1 |
| 2005/0203946 A1* | 9/2005 | Pauly et al. | 707/102 |
| 2006/0034292 A1* | 2/2006 | Wakayama et al. | 370/395.5 |
| 2006/0233137 A1* | 10/2006 | Dantu et al. | 370/331 |
| 2006/0268682 A1* | 11/2006 | Vasseur | 370/216 |
| 2008/0002588 A1* | 1/2008 | McCaughan et al. | 370/238 |

* cited by examiner

*Primary Examiner* — Chirag R Patel

(57) ABSTRACT

A system and process may include assigning a unique host identifier to a host that is a node of a network. The host is adapted to host at least one network interface. The system and process may further include creating a host/guest relationship for each hosted network interface by associating a network interface identifier of the hosted network interface with the unique host identifier.

19 Claims, 6 Drawing Sheets

200c

| L7- L5 | L4 | L3 | L2 | Host ID | L1 |
|---|---|---|---|---|---|

| L7- L5 | L4 | L3 | Host ID | MPLS Label | L2 | L1 |
|---|---|---|---|---|---|---|

Host/guest look up table

| Network Interface ID | Host ID |
|---|---|
| 08 00 20 00 70 DF | 0.000800200070DF.0 |
| 00 08 74 4C 7F 1D | 0.000800200070DF.0 |
| 08 00 09 00 7F 1D | 0.0008000900 7F1D.0 |
| 08 00 2B 00 70 DF | 0.0008000900 7F1D.0 |

Network Interface 1 → 08 00 20 00 70 DF
Network Interface 2 → 00 08 74 4C 7F 1D
Network Interface 3 → 08 00 09 00 7F 1D
Network Interface 4 → 08 00 2B 00 70 DF Host 1 brace: rows 1–2
Host 2 brace: rows 3–4

FIG. 3

SYSTEMS AND METHODS FOR HOST IDENTIFICATION

BACKGROUND INFORMATION

In a data communication network, each node may be a piece of equipment and each piece of equipment may be referred to as a host. Some hosts may have unique identifiers recognized by networking protocols. For example, a router may have an IP address that may be used by networking protocols such as TCP/IP. But some network hosts may have no unique identifier recognized by networking protocols. For example, an Optical Add-drop Multiplexer (OADM) in an optical signaling network may have no identifier that may be used by a networking protocol. Networking protocols may not identify a host when the host has no unique host identifier.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIG. 2c is a block diagram of a packet header with a Host ID Header between the header sections of Layer 1 and Layer 2 according to an exemplary embodiment;

FIG. 2d is a block diagram of a packet header with a Host ID Header between the header sections of MPLS Label and Layer 3 according to an exemplary embodiment;

FIG. 3 is a host/guest lookup table according to an exemplary embodiment;

Figure 1:
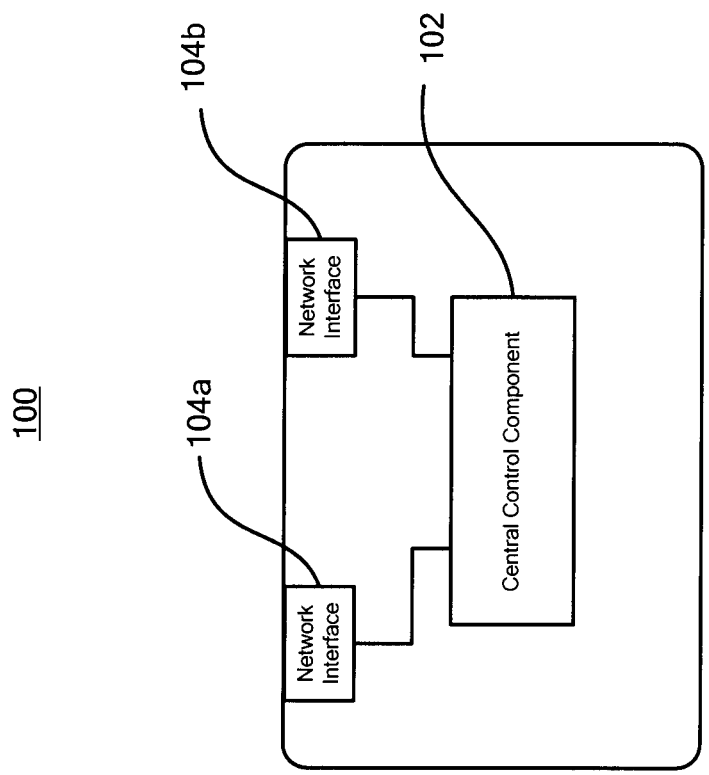
FIG. 1 is a block diagram of a host with two network interfaces according to an exemplary embodiment.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A method and system in accordance with exemplary embodiments may include assigning a unique identifier to each host that comprises a node in a data communication network. Each host may host one or more network interfacing devices that may be referred to as network interfaces. The method and system in accordance with exemplary embodiments may include providing each hosted network interfaces with the identifier of the host and associating the identifier of the host with a unique identifier of the hosted network interface. The associated identifiers may form a pair of identifiers that represent a host/guest relationship for the host and the hosted network interface. The method and system may further include transmitting the pair of identifiers to other nodes in the network and storing pairs of identifiers of some or all network interfaces and their hosts in a host/guest lookup table on at least one node in the network. The method and system may further use the host/guest lookup table to build one or more primary packet delivery paths, and one or more back up packet delivery paths, between a source and a destination node, such that the paths may avoid a common host.

The description below describes hosts and network interfaces hosted on these hosts. As used therein, a "host" may be understood to refer to a piece of data communication equipment with one central control component and one or more network interfaces. The term "host" used as a verb may be understood to refer to the relationship that all network interfaces associated with one host may be controlled by the central control component of the host. The term "central control component" may be understood to refer to software, firmware, hardware, and/or various combinations thereof that form the central control unit of the host. The term "network interfaces" may be understood to refer to devices that may communicate by electrical or optical signals in various technologies such as, but not limited to, Time Division Multiplexing (TDM), Frequency Division Multiplexing (FDM), Wavelength Division Multiplexing (WDM). For example, a host may be a router with one or more chassis. Each of the chassis may have its own cooling system and power supply and may host one or more network interfacing devices, e.g., network interface cards. The router may have a central control component of a multi-CPU control unit with software running thereon. In another exemplary embodiment, a host may be a piece of Optical Cross-connect (OXC) equipment that may host one or more optical network interfaces. The OXC may be centrally controlled by a single central control component.

The description below also describes packet delivery paths. In a network, a packet delivery path is a path that a packet travels from a source node to a destination node. In some networks, a packet delivery path may not be pre-determined, such as TCP/IP networks, as is well known. A pre-calculated packet delivery path may be a path that is determined before any user's data is transmitted by a source node such as, but not limited to, a Label Switched Path in a Multiprotocol Label Switching (MPLS) network. A path or packet delivery path refers to a pre-calculated packet delivery path in this disclosure.

In describing a network topology, each node in a network may be known by a descriptive name, such as, but not limited to, node 3, Switch 3 on Third Floor, Router 123 at Service Provider A, or Reconfigurable Optical Add-drop Multiplexer (ROADM) 1 in Denver. However, the descriptive name may not be used in networking protocols such as, but not limited to Ethernet, TCP/IP or MPLS. For example, in an Ethernet network, a physical address of a network interface such as a Media Access Control (MAC) address may be used by a packet to identify a destination node. In a TCP/IP network, an IP address may be used to identify a destination node. In a MPLS network, a packet delivery path may be pre-calculated based on a destination IP address, and the path information may be stored in a label to let a MPLS router determine where to forward a packet.

Currently, some network hosts may have unique identifiers in addition to the identifiers associated with a hosted network interface. For example, a switch may be a host to a plurality of switch cards. The switch may have an IP address and/or a MAC address. The IP address or the MAC address of the switch is different from the IP address or MAC address of any hosted switch card. However, the hosted switch card may not be aware of the IP/MAC address of the host, and when the switch card delivers a packet to a second connected network node, the switch card only attaches the switch card's IP/MAC address and does not attach the host's IP/MAC address.

A network protocol to identify a host at an OSI Layer 1, Layer 2 or Layer 3 level according to the present disclosure may be implemented. Each host may be assigned a host identifier that may be recognizable at the level of Layer 1, 2, or 3. The host identifier may be paired with identifiers of each of hosted network interfaces on the host to create host/guest relationships for each of the hosted network interfaces. Each of the hosted network interfaces may transmit pairs of identifiers of the host/guest relationship when sending packets to other nodes in the network. The pairs of identifiers of the host/guest relationship in a network may be stored in one or more hosts in host/guest lookup tables. Existing networking protocols may be extended or modified, and/or new networking protocols may be implemented to use the host/guest relationship. For example, the host/guest relationship may be used to determine a packet delivery path by a networking protocol that pre-calculates packet delivery paths such as, but not limited to, MPLS. The MPLS may be extended or modified to use the host/guest lookup table to build diverse packet delivery paths, such that these diverse paths may avoid repeating a common host. The modified or extended MPLS may avoid a single point of failure by avoiding a common host in any two paths.

FIG. 1 is a block diagram of a host with two network interfaces according to an exemplary embodiment. A network node may be a host with at least one hosted network interface such as, but not limited to, a computer with a network card, or a mobile personal communication device (e.g., a PDA, or a cell phone) with a wireless network interface. Some network nodes may have a plurality of hosted network interfaces (e.g., a router). A node may receive a data packet on a first network interface. Then, the node may process the data packet (e.g., identify the packet's destination, and/or swap a packet header). And, the node may transmit the processed data packet on the first or a second network interface. The host 100 may be a piece of communication equipment such as, but not limited to, a switch, a router, a computer, an Optical Cross-connect device, a digital Cross-connect device, or other network equipment capable of receiving and transmitting packets. A hosted network interface may be a communication device that may transmit and/or receive electrical or optical signals. For example, the host 100 may be an electrical signaling switch in an electrical network and the network interfaces 104a, 104b may be electrical signaling network cards hosted on the switch. In another example, the host 100 may be an OXC in an optical network and the network interfaces 104a, 104b may be optical network interfaces of the OXC.

Figure 2A:
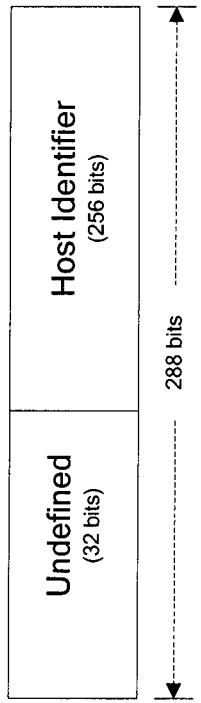
FIG. 2a is a block diagram of a Host ID Header according to an exemplary embodiment.

FIG. 2a is a block diagram of a Host ID Header according to an exemplary embodiment. A host may be uniquely identified in a network by a unique host identifier (Host ID). The unique host identifier may incorporate any existing identifiers or addresses the host may have, such as, but not limited to, a Physical Layer address (Layer 1 identifier), a Data Link Layer address (Layer 2 identifier, e.g., a MAC address) or a Network Layer address (Layer 3 identifier, e.g., an IP address), or any other identifiers that may uniquely identify the host in the network at Layer 1, Layer 2 or Layer 3. In one exemplary embodiment, the Host ID may take a combination of the Layer 1, Layer 2 and Layer 3 addresses, e.g., layer1.layer2.layer3. In another exemplary embodiment, the Host ID may only take the Layer 2 address and keep all other bits as zero (0), e.g., 0.layer2.0. The unique host identifier may be included in a packet header for transmission to other nodes of a network. For example, as shown in FIG. 2a, a unique host identifier may be packaged in a header section of 288 bits, and may be referred to as a Host ID Header. The Host ID Header may comprise two fields. A first field may be a field of 256 bits of a Host ID. A second field may be an "Undefined" field of 32 bits for other uses that may be developed in the future. In one exemplary embodiment, the 256 bits Host ID may be in a form of layer1.layer2.layer3 addresses. The layer 1 address may be a physical layer address of 72 bits; the layer 2 address may be a MAC address of 56 bits; and the layer 3 address may be an IPv6 address of 128 bits. In another examplary embodiment, the length of each address may be different (e.g., the physical layer address may be 56 bits, the MAC address may be 48 bits, or the IP address may be an IPv4 of 32 bits). Padding of the addresses may be used as is well known in the art.

Figure 2B:
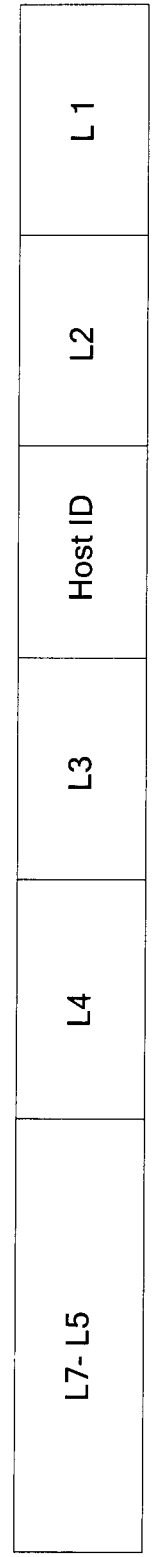
FIG. 2b is a block diagram of a packet header with a Host ID Header between the header sections of Layer 2 and Layer 3 according to an exemplary embodiment.

FIG. 2b is a block diagram of a packet header with a Host ID Header between the header sections of Layer 2 and Layer 3 according to an exemplary embodiment. The Host ID Header may be transmitted to other network nodes in a packet header by a hosted network interface. As is well known, in a data communication network, data may be grouped into packets and each packet may be padded with layers of headers such as the OSI 7-Layer model for network communication. The exemplary Host ID Header 20a may be used in an modified OSI 7-Layer model. For example, as shown, a Host ID Header 20a may be inserted between the headers of Layer 2 and Layer 3. By adding the Host ID Header 20a, a host/guest relationship may be formed for each network interface hosted on a host. That is, each packet transmitted from a node may carry a Host ID of the originating host as well as an identifier for the network interface contained in the Layer 2 or Layer 3 header. The network interface identifier in the Layer 2 header may be a MAC address for the network interface and the network interface identifier in the Layer 3 header may be an IP address for the network interface. The Host ID and the network interface identifier may be acted upon by a receiving node as a pair of identifiers for a host/guest relationship. This host/guest relationship may be stored in databases or files by one or more nodes in the network for a variety of uses such as, but not limited to, building a host/guest lookup table for all nodes in the network.

FIG. 2c is a block diagram of a packet header with a Host ID Header between the header sections of Layer 1 and Layer 2 according to an exemplary embodiment. Layer 1 is the Physical Layer of OSI 7-Layer model. A Host ID Header may be placed adjacent to the Physical Layer such that a device implementing functionality of a Physical Layer of OSI 7-Layer model may act upon the Host ID information. A host/guest relationship may be formed and stored in other nodes for each hosted network interface as previously described.

FIG. 2d is a block diagram of a packet header with a Host ID Header between the header sections of MPLS Label and Layer 3 according to an exemplary embodiment. A host/guest relationship may be formed and stored in other nodes for each hosted network interface as previously described. In addition, a Host ID header may work in conjunction with the connection-oriented network protocols such as, but not limited to, MPLS, Generalized MPLS (GMPLS), Provider Backbone Transport (PBT) or Transport MPLS (TMPLS). That is, a connection-oriented network protocol may be modified or extended to use the Host ID as described below.

FIG. 3 is a host/guest lookup table according to an exemplary embodiment. As described previously, one exemplary way of using the Host ID information may be using a host/guest lookup table to facilitate looking up of Host IDs. As shown in FIG. 3, a host/guest lookup table such as table 300 may store pairs of Network Interface ID and Host ID. In this exemplary table, a Network Interface ID may be a 48 bits MAC address and a Host ID may be a 256 bits unique identifier. The Host ID may be take a Network Interface ID of a network interface hosted thereon and pad zero (0) to have 56 bits for a layer 2 address in a layer1.layer2.layer3 format. The zero (0) may be padded in the beginning as shown in FIG. 3. In another examplary embodiment, the zero (0) may be padded in the end of the layer 2 address field. Referring back to FIG. 3, Network Interface 1 and 2 share a common Host ID, meaning these two Network Interfaces are hosted on the same host, e.g., Host 1. Also in the exemplary table 300, Network Interface 3 and 4 share a common host ID, meaning they are hosted on the same host, e.g., Host 2.

The host/guest lookup table may be consulted when a source node need to pre-calculate more than one packet delivery paths to a destination node, such that a host identifier may be chosen only once for all pre-calculated paths between the same source and destination nodes (except the source or destination node). For example, the source node may know topology of a network by acquiring knowledge of the network interface identifiers of the network, such as IP addresses or MAC addresses of all network interfaces of all nodes in the network, as is well known. The source node may query the host/guest lookup table to find Host IDs for each network interface identifiers that may be incorporated in a primary path between the source and the destination nodes. When building additional paths between the same source and the destination nodes, the source node may consult the host/guest lookup table to avoid Host Ids that may have already been incorporated in existing paths. For example, referring back to FIG. 3, both Host 1 and Host 2 may be intermediate nodes between a source node and a destination node. By using a host/guest lookup table of 300, the source node may choose a primary packet delivery path going through Host 1 and a back up packet delivery path avoiding Host 1. Every node except the source and destination nodes along the primary path may be avoided in choosing another path between the source and destination nodes by this process. If a back up packet delivery path could not be built, a failure notice may be sent to a network administrator. The network administrator may take appropriate action such as, but not limited to, redesign the network to add more redundancy so that a back up path may be built.

The host/guest lookup table 300 may be stored in one or more designated nodes in a network. These designated nodes may be servers in the network to provide information storage and look up functionality to other nodes. In this embodiment, any nodes in the network may submit a query to the designated nodes and receive the query result. The query process may use existing network protocols as is well known. In another exemplary embodiment, the host/guest lookup table 300 may be maintained by each node in a network. Therefore, each node may perform look up operations locally on the node itself instead of communicating with a designated server for this operation. The table 300 may be built using existing information flooding algorithm in a network.

The host/guest lookup table may be used by a control plane signaling protocol to build a packet delivery path. A control plane signaling protocol may communicate control signals in a separate communication channel without mixing with data signals. For example, in a packet based network, a control plane signaling protocol such as Border Gateway Protocol (BGP) or Resource ReSerVation Protocol Traffic Engineering (RSVP TE) may communicate control messages by special packets. The special packets may be only for control functions and do not carry data of other applications. BGP and RSVP TE may be exemplary control plane signaling protocols to be modified or extended to use the host/guest lookup table to build packet delivery paths.

Figure 4:
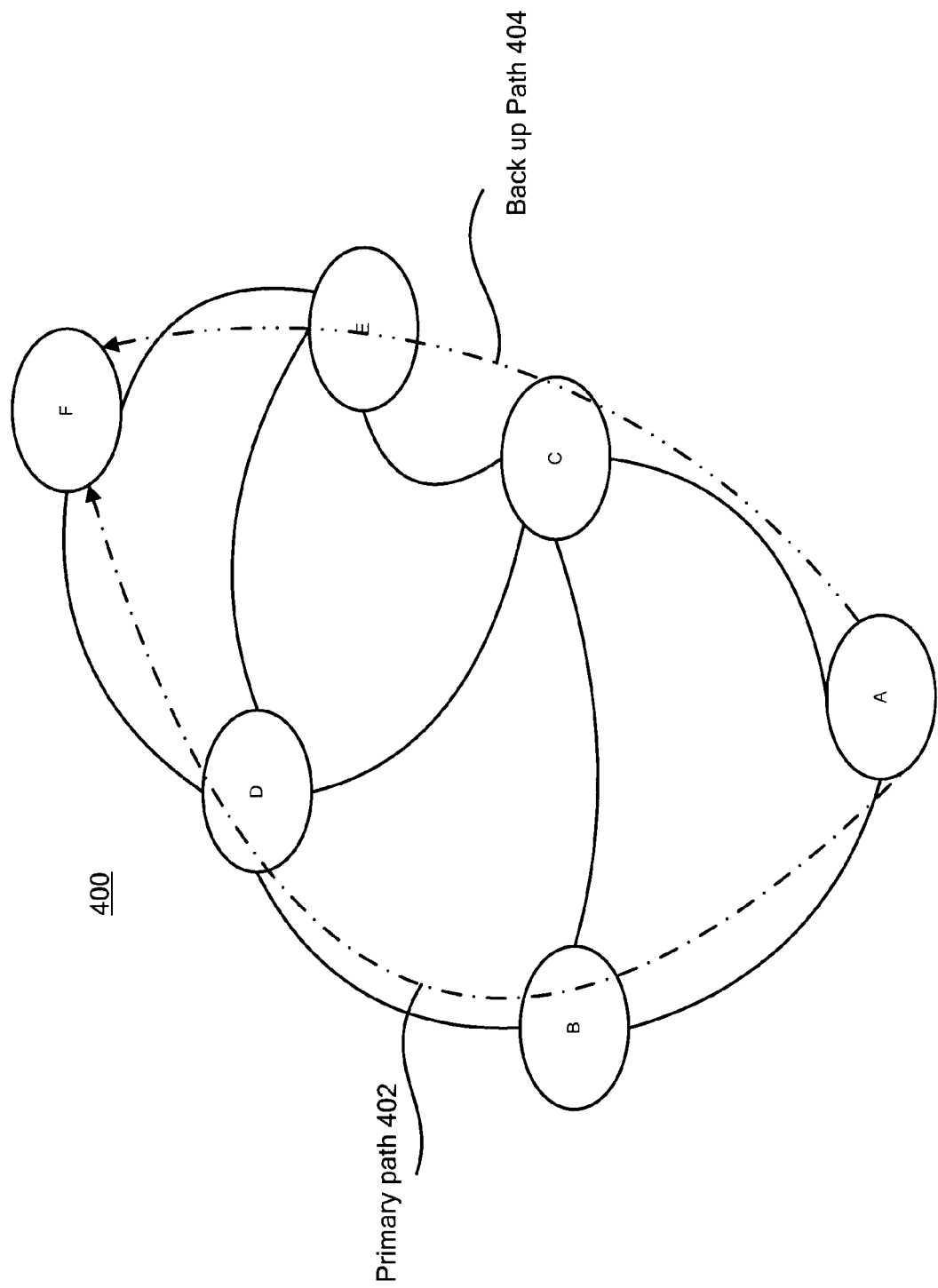
FIG. 4 is a schematic diagram of a data communication network with two diverse packet delivery paths according to an exemplary embodiment.

FIG. 4 is a schematic diagram of a data communication network with two diverse packet delivery paths according to an exemplary embodiment. As shown in FIG. 4, Node A is a source node that may need to build a primary packet delivery path and a back up packet delivery path to a destination node Node F. In this example, each node in the network may maintain a host/guest lookup table 300. That is, each node in the network may maintain a host/guest lookup table that may store pairs of identifiers for each network interfaces hosted on all nodes of the network, i.e., Nodes A, B, C, D, E, and F. Node A may build a primary packet delivery path to Node F, e.g., the Primary Path 402. The Primary Path 402 may start at Node A and go through Nodes B and D to Node F. In addition to the Primary Path 402, Node A may also build a back up path to Node F, such as a Back up Path 404, which goes through Nodes A, C, E, and F. When building the Back up path 404, Node A may want to avoid any node which may have already been incorporated on the Primary Path 402. For example, by using the host/guest lookup table of the network, Node A may avoid Node B and Node D when building the Back up path 404. This path building mechanism may be employed by any protocols that pre-calculate a path between a source node and a destination node on a packet based network such as, but not limited to, Provider Backbone Transport (PBT), MPLS and various MPLS extension protocols (e.g., TMPLS). For example, network 400 may be a MPLS network, source node Node A may be a Label Switching Router (LSR) where a packet may come into the MPLS network (ingress LSR). Destination node Node F may be a LSR where a packet may leave the MPLS network (egress LSR). When the MPLS network builds packet delivery paths from Node A to Node F, it may use a host/guest lookup table to build a Primary Path 402 and a Back up Path 404, such that Primary Path 402 and Back up Path 404 do not share a common host.

Figure 5:
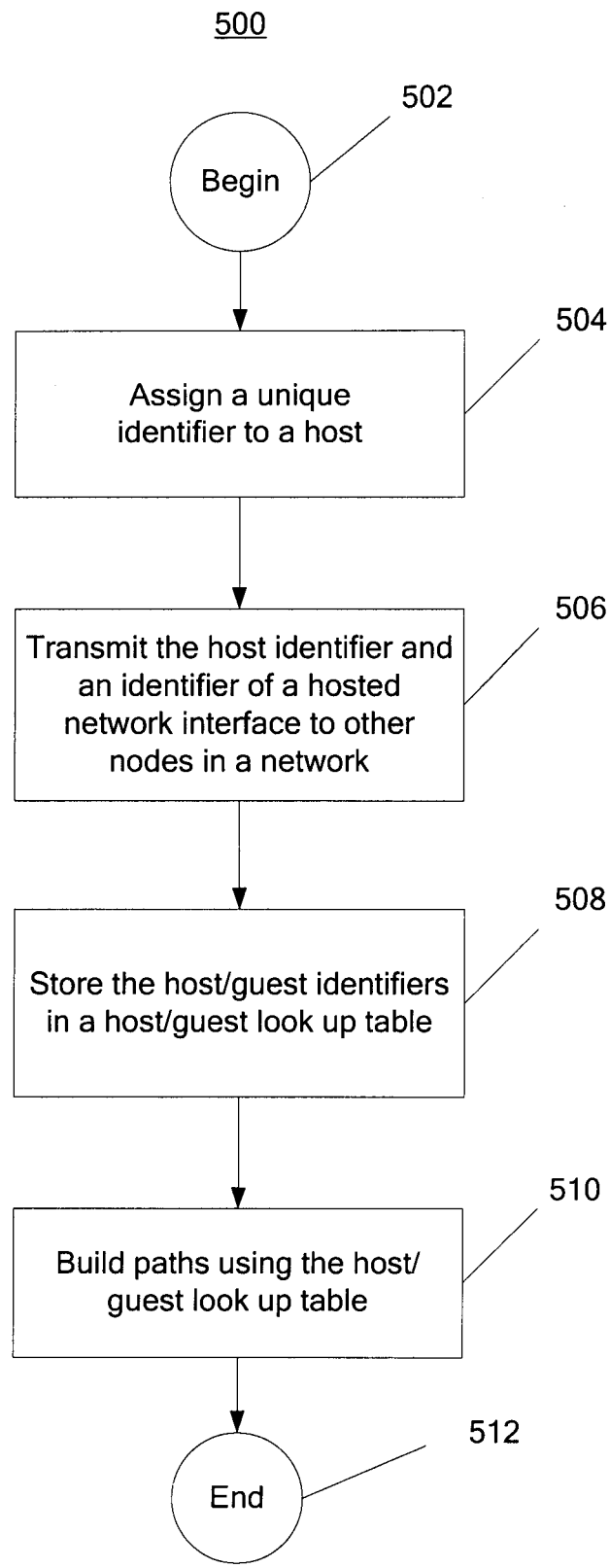
FIG. 5 is a flow diagram of a method for assigning and using the unique host identifier according to an exemplary embodiment.

FIG. 5 is a flow diagram of a method for assigning and using the unique host identifier according to an exemplary embodiment. The method 500 may begin at block 502 and may continue to block 504. In block 504, an equipment manufacturer, a network administrator, or a network protocol may assign a unique host identifier to a host. For example, a host identifier may be an identifier of a MAC address, such that a manufacturer may assign an identifier to the piece of equipment during the manufacturing process. In another exemplary embodiment, the host identifier may be a unique identifier of an IPv4 or IPv6 address, such that a network administrator or a network protocol may assign the identifier to the host when the host may be deployed in a network. After the assignment of a unique host identifier, the method 500 may continue to block 506.

In block 506, the unique host identifier may be transmitted along with an identifier of a hosted network interface to other nodes in the network. The host identifier may be transmitted by extending or modifying an existing protocol such as, but not limited to, IP or Ethernet. For example, a Host ID packet header may be placed in a packet's header section at a source node with other headers for IP or Ethernet communication, and the packet may then be transmitted by IP or Ethernet protocols to other nodes. The identifier of the hosted network interface may be a Data Link Layer level identifier (e.g., a MAC address) or a Network Layer level identifier (e.g., an IP address). The pair of identifiers may be represent a host/guest relationship. Then the method 500 may continue to block 508.

In block 508, the pair of identifiers may be stored in a host/guest lookup table. One or more nodes of the network may be designated to store the host/guest lookup table, or each node may maintain a copy of the host/guest lookup table for its own use. For example, a node in the network may be designated as a server node to store the host/guest lookup table and process queries submitted by other nodes to look up host/guest relationships in the table. In another example, each node may maintain a host/guest lookup table and perform the look up of host/guest relationship. Then the method 500 may continue to block 510.

In block 510, packet delivery paths may be built by using the host/guest lookup table. The pairs of host/guest identifiers may be acted upon by control plane signaling protocols. For example, a host identifier may be used by control plane signaling protocol such as BGP. BGP may use the host/guest relationship to build routing paths that each path may avoid a host already incorporated in another path. In another example, RSVP-TE may use the host/guest lookup table to build label switched paths in a MPLS network. Then, the method 500 may continue to block 512 and end.

Thus, a host in a data communication network may be assigned a unique host identifier. The host identifier may be associated with identifiers of each network interface hosted thereon. Each hosted network interface may transmit a pair of identifiers representing a host/guest relationship to other nodes. Existing network protocols may be extended or modified to transmit the host/guest relationship to other nodes in the network. Further, the host/guest relationship may be stored in a host/guest lookup table in one or more nodes by the network. Control plane and data plane signaling protocols may acknowledge and act upon the host/guest relationship.

In the preceding specification, various exemplary embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   assigning a unique host identifier to a host, the host being a node of a plurality of nodes in a network and including at least one network interface and a lookup table;
   creating a pair of identifiers that represent a host/guest relationship for the host and each network interface by associating a network interface identifier of the at least one network interface with the unique host identifier;
   transmitting the pair of identifiers that represent the host/guest relationship for each network interface to the lookup table of each node of the plurality of nodes in the network such that the lookup table comprises the associated network interface identifier and the unique host identifier; and
   storing the pair of identifiers in the host/guest lookup table in each node of the plurality of nodes in the network;
   wherein the lookup table is used to build a primary packet delivery path and a back up delivery path in the network.

2. The method of claim 1, wherein the unique host identifier is transmitted in a header section between header sections of Layer 2 and Layer 3 of OSI 7-layer model.

3. The method of claim 1, the unique host identifier is transmitted in a header section between header sections of Layer 1 and Layer 2 of OSI 7-layer model.

4. The method of claim 1, wherein the unique host identifier is transmitted in a header section between header sections of MPLS and Layer 3 of MPLS packet layer model.

5. The method of claim 1, wherein the host is one of a computer, a router, a switch, an Optical Cross-connect (OXC) device, a Digital Cross-connect (DXC) device, and an Optical Add-drop Multiplexer (OADM).

6. The method of claim 1, further comprising using the host/guest lookup table to build the primary path and the back up path in the network between a source node and a destination node, with no two paths sharing a common host identifier.

7. A system, comprising:
   a plurality of hosts as nodes, each host having a unique host identifier and at least one hosted network interface, and the at least one hosted network interface having a unique network interface identifier; and
   at least one host/guest lookup table stored at each of the plurality of hosts in the network, the host/guest lookup table comprising pairs of identifiers, each pair of identifier comprising the unique host identifier and the unique network interface identifier, wherein the lookup table is used to build a primary packet delivery path and a back up delivery path in the network,
   wherein the pairs of identifiers in the host/guest lookup table is stored in each node of the plurality of nodes in the network.

8. The network of claim 7, wherein the unique host identifier is one of an Internet Protocol (IPv4 or IPv6) address and a Media Access Control address (MAC address).

9. The network of claim 7, wherein the unique network interface identifier is one of an Internet Protocol (IPv4 or IPv6) address and a Media Access Control address (MAC address).

10. The network of claim 7, wherein each hosted network interface communicates using one of electrical signals and optical signals.

11. The network of claim 7, wherein the host is at least one of a computer, a router, a switch, an Optical Cross-connect (OXC) device, a Digital Cross-connect (DXC) device, and an Optical Add-drop Multiplexer (OADM).

12. The network of claim 7, further comprising host/guest lookup tables in each node of the network.

13. The network of claim 7, wherein the host/guest lookup tables are built or updated by flooding the network with pairs of the identifiers.

14. A system, comprising:
   a piece of host equipment having a central control component and a unique host identifier and storing a lookup table; and
   at least one hosted network interface, each hosted network interface having a unique network interface identifier, controlled by the central control component, and adapted to transmit the unique host identifier along with the unique network interface identifier to a corresponding lookup table of each host equipment of a plurality of host equipments in a network, wherein the lookup table is used to build a primary packet delivery path and a back up delivery path in the network, and
   wherein the lookup table comprises a list of associated identifiers including the unique network interface identifier and the unique host identifier, and
   wherein the lookup table is stored in each of the plurality of host equipment in the network.

15. The system of claim 14, wherein the unique host identifier is one of an Internet Protocol (IPv4 or IPv6) address and a Media Access Control address (MAC address).

16. The system of claim 14, wherein the unique network interface identifier is one of an Internet Protocol (IPv4 or IPv6) address and a Media Access Control address (MAC address).

17. The system of claim 14, wherein each network interface communicates using one of electrical signals and optical signals.

18. The system of claim 14, wherein the piece of host equipment is one of a computer, a router, a switch, an Optical Cross-connect (OXC) device, a Digital Cross-connect (DXC) device, and an Optical Add-drop Multiplexer (OADM).

19. The method of claim 1, wherein each of the at least one network interfaces transmits the pair of identifiers comprising the network interface identifier and the unique host identifier when sending packets to other nodes in the network.

* * * * *